United States Patent [19]

Tsuji et al.

[11] Patent Number: 5,010,395
[45] Date of Patent: Apr. 23, 1991

[54] SOLID STATE IMAGING APPARATUS

[75] Inventors: Kiyoshi Tsuji, Tanashi; Kenji Kimura, Tachikawa, both of Japan

[73] Assignee: Olympus Optical Co., Ltd., Tokyo, Japan

[21] Appl. No.: 322,038

[22] Filed: Mar. 13, 1989

[30] Foreign Application Priority Data

Apr. 20, 1988 [JP] Japan .................. 63-98840
May 25, 1988 [JP] Japan ................. 63-129238

[51] Int. Cl.⁵ ............................ A61B 1/04; H04N 5/18
[52] U.S. Cl. .................................... 358/44; 358/34; 358/41; 358/98; 358/172; 358/178
[58] Field of Search .............. 358/41, 98, 172, 163, 358/213.16, 213.15, 34, 904, 174, 178, 44; 455/260

[56] References Cited

U.S. PATENT DOCUMENTS

| | | | |
|---|---|---|---|
| 3,321,574 | 5/1967 | Krause | 358/34 |
| 4,189,755 | 2/1980 | Balbes et al. | 358/904 |
| 4,475,539 | 10/1984 | Konomura | 358/98 |
| 4,525,741 | 6/1985 | Chahal | 358/174 |
| 4,631,582 | 12/1986 | Nagasaki | 358/174 |
| 4,667,242 | 5/1987 | Hagino | 358/174 |
| 4,682,211 | 7/1987 | Kaji | 358/41 |
| 4,730,210 | 3/1988 | Leshko | 358/172 |
| 4,786,969 | 11/1988 | Shouji et al. | 358/213.16 |
| 4,816,917 | 3/1989 | Yamamoto et al. | 358/213.16 |
| 4,910,592 | 3/1990 | Shroy | 358/174 |
| 4,928,172 | 5/1990 | Uehara | 358/174 |

FOREIGN PATENT DOCUMENTS

62-236274 10/1987 Japan .

Primary Examiner—Howard W. Britton
Attorney, Agent, or Firm—Armstrong, Nikaido, Marmelstein, Kubovcik & Murray

[57] ABSTRACT

The solid state imaging apparatus having a black level correcting circuit of this invention has an imaging device provided with a solid state imaging device and a signal processing device connected to this imaging device, processing the picture image signal obtained by the solid state imaging device and outputting a video signal. The signal processing device is provided with a gain controlling amplifier receiving the photoelectrically converted output of the solid state imaging device and variably gain-controlling it and a direct current-clamping circuit direct current-clamping the optical black part included in the output signal of the solid state imaging device and stabilizing the black level of the video signal.

5 Claims, 6 Drawing Sheets

RELATED ART

FIG. 3(a)
OPTICAL BLACK CLAMPING PULSE

FIG. 3(b)
OUTPUT WAVEFORM OF CDS CIRCUIT 27

FIG. 3(c)
CLEANING PULSE A

FIG. 3(d)
OUTPUT WAVEFORM OF CLEANING CIRCUIT 29

FIG. 3(e)
CLEANING PULSE

FIG. 3(f)
CLAMPING PULSE A

FIG. 3(g)
CLAMPING PULSE

FIG. 3(h)
OUTPUT WAVEFORM OF CLEANING CIRCUIT 29a

FIG. 4 (RELATED ART)

RELATED ART

FIG. 5(a)
OUTPUT OF LPF47

FIG. 5(b)
OUTPUT OF LPF47

FIG. 5(c)
OUTPUT OF R OF SYNCHRONIZING CIRCUIT

FIG. 5(d)
OUTPUT OF B OF SYNCHRONIZING CIRCUIT

FIG. 7(a)
OUTPUT SIGNAL OF CCD

FIG. 7(b)
R SAMPLING PULSE

FIG. 7(c)
G SAMPLING PULSE

SOLID STATE IMAGING APPARATUS

FIELD AND BACKGROUND OF THE INVENTION

This invention relates to a solid state imaging apparatus having a black level correcting circuit.

Recently, there is extensively used an endoscope (scope or fiber scope) whereby an elongate insertable part is inserted into a body cavity so that organs within the body cavity may be diagnosed or inspected.

Such endoscope is used not only medically but also industrially to observe and inspect an object within a boiler, machine, pipe of a chemical plant or the like or device.

Further, there is used an electronic scope using such solid state imaging device as a charge coupled device (which shall be abbreviated as a CCD hereinafter) for an imaging means. This electronic scope has advantages that the resolution is higher than in a fiber scope, it is easy to record and reproduce picture images and such picture image processes as the magnification of picture images and the comparison of two pictures are easy. In the above mentioned electronic scope, particularly, in a color imaging system by a so-called mosaic color filter system wherein a mosaic-like color filter is secured to the image forming surface of a CCD, a photoelectric converted output is obtained in a signal type in which a color carrier is superimposed on a luminance signal obtained in a CCD. This color carrier is obtained by a mosaic color filter secured at 1 to 1 with the unit pixel of the CCD. Naturally, the sizes of the obtained luminance signal and the color carrier are proportional to the incident light amount of the CCD and, if the incident light amount is perfectly intercepted, both should be non-signals. However, even if the light is intercepted, the color carrier will not become a non-signal and a slight color carrier will be generated as a residual color carrier. When the light is intercepted, the color video signal to be finally obtained will be black but, if the above mentioned residual color carrier is present, the color video signal will not become perfect black and a colored phenomenon will be generated. This is generally called a slip of a black balance. The residual color carrier is mostly generated by the electrostatic capacity combination of the driving signal (pulse) driving the CCD with the photoelectric conversion output of the CCD. Particularly, in the electronic scope, the above mentioned CCD driving circuit is provided on the body side and the CCD driving signal is fed to the CCD provided in the endoscope tip part by using a cable of about 3 to 5 meters formed within the scope. On the other hand, the CCD photoelectrically converting output is transmitted to the body side from the tip part by also using the cable of about 3 to 5 m. As the scope is required to be as small as possible in the outside diameter for the purpose of improving the operatability, an electrostatic capacity combination will be produced between the cables and the CCD driving signal will be generated in the CCD photoelectrically converting output.

Figure 1:
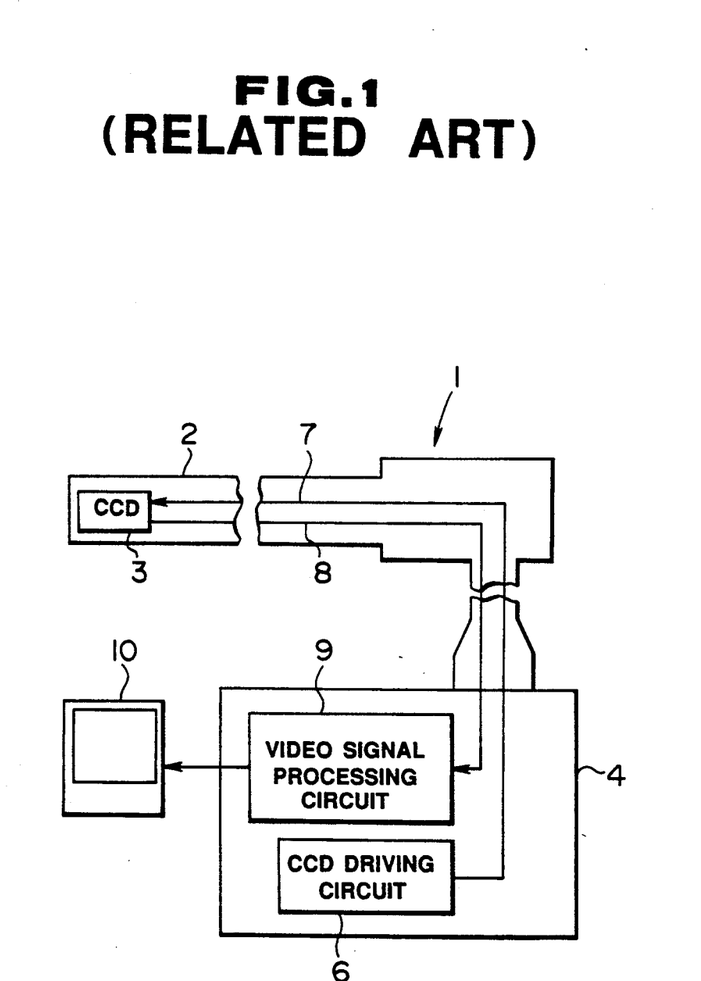
FIG. 1 is a schematic view of an endoscope.

In FIG. 1, a CCD 3 is provided in the tip part of an insertable part 2 of an electronic scope 1. The output of a CCD driving circuit 6 provided within a control apparatus 4 connected to the electronic scope 1 is transmitted to the CCD 3 by a cable 7 inserted through the insertable part 2. On the other hand, the photoelectrically converted output of the CCD 3 is transmitted to a video signal processing circuit 9 provided within the control apparatus 4 by a cable 8, is processed to be a video output and is displayed on the picture surface of a monitor 10. The cables 7 and 8 are provided in parallel with one another. In fact, a shielding wire is used but it is impossible in the structure of the shielding wire to perfectly shield them. Therefore, the signals flowing through both cables 7 and 8 will interfere with each other and particularly the leak of the CCD driving signal to the photoelectrically converted output will be large.

As explained above, such phenomena as in the following will be produced in the obtained video signal by the mutual interference of signals with each other.

The greatest defect is that the black balance of the video signal will be very unstable. Generally, in a CCD, a part of the light receiving area is light-shielded by a light shielding member and the region (which shall be abbreviated as an OB region hereinafter) of the signal corresponding to this part is made a reference level of a black level. As a result of the leak of the CCD driving signal by the mutual interference into this OB region as mentioned above, the black level will become unstable.

General circuits as illustrated in FIGS. 2 to 5 will be explained hereinafter.

Figure 2:
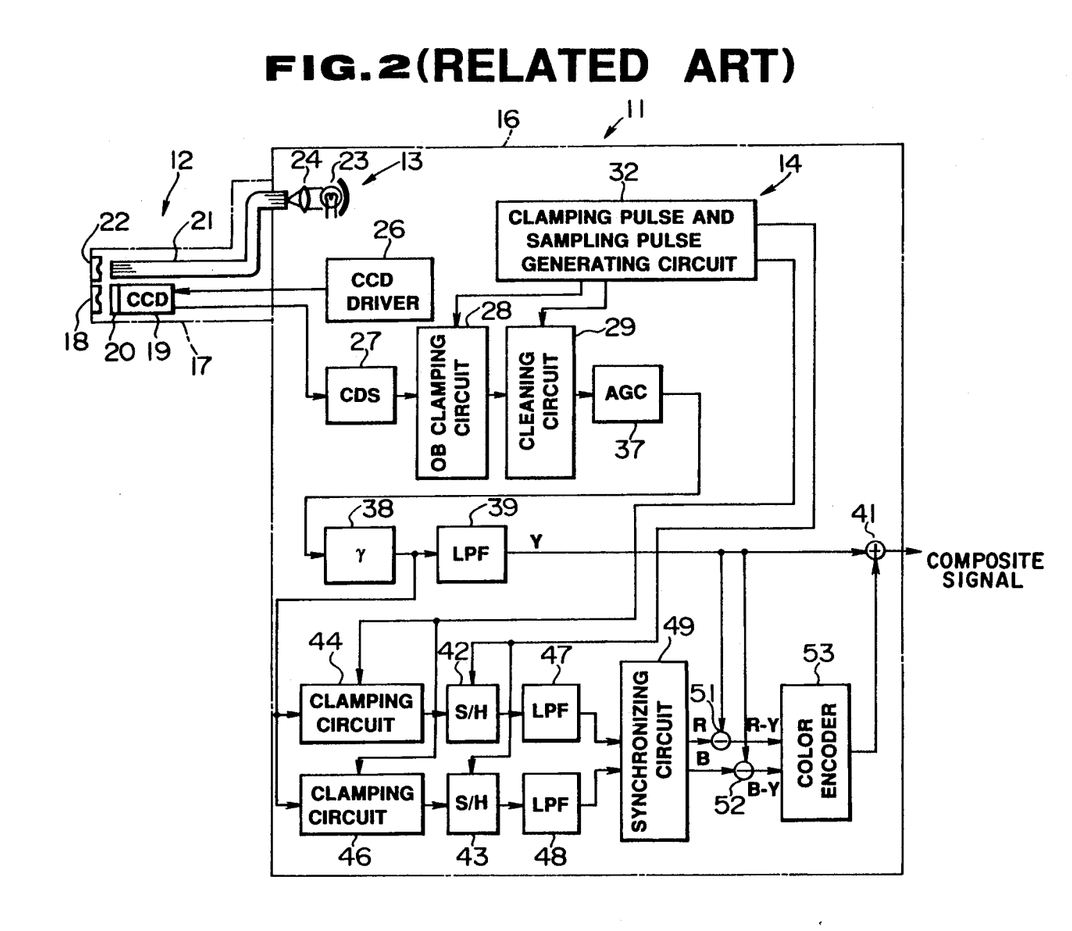
FIG. 2 is a block diagram for explaining a solid state imaging apparatus.

As shown in FIG. 2, an endoscope apparatus 11 comprises an electronic scope 12 in which an imaging means is incorporated, a light source part 13 feeding an illuminating light to this electronic scope 12 and a control apparatus 16 housing a signal processing part 14 converting the signal imaged by the electronic scope 12 to a video signal which can be displayed in a displaying apparatus.

In the above mentioned electronic scope 12, an elongate insertable part 17 is formed so as to be easy to insert into a body cavity and, on the tip surface side of this insertable part 17, an objective lens 18 and CCD 19 are arranged and an imaging means is incorporated. By the way, a color mosaic filter 20, in which filters transmitting respective color lights, for example, of red (R), green (G) and blue (B) are provided in the form of a mosaic, is pasted on the imaging surface of the CCD 19.

A light guide 21 transmitting the illuminating light is inserted through the above mentioned insertable part 17, transmits the illuminating light fed from the light source part 13 and emits it from the tip surface. This emitted illuminating light is expanded by a light distributing lens 22 and illuminates the object side.

The light source part 13 feeding the illuminating light is provided on the hand base side end surface of the above mentioned light guide 21 and is provided with a light source lamp 23 and a condenser lens 24 condensing a white light emitted from this light source lamp 2.

The image of the object illuminated with the above mentioned illuminating light is formed on the imaging surface of the CCD by the objective lens 18 and is color-separated by the color mosaic filter 20. A signal photoelectrically converted by the application of a driving pulse for transferring and reading out the object image from a CCD driving circuit 26 is read out.

The output signal of the CCD 19 is input into a double sampling circuit 27 forming the signal processing part 14. This double sampling circuit 27 double samples the CCD output signal to remove the 1/f and reset noise contained in the CCD output signal and makes it a signal improved in the S/N ratio. This signal is input into an optical black clamping circuit (which shall be abbreviated as an OB clamping circuit hereinafter) 28. In this OB clamping circuit, in order to prevent the black level from being fluctuated by the increase and decrease of the dark current of the CCD 19, the optical black period (which shall be abbreviated as the OB period hereinafter) of the input signal is direct current-clamped by an OB period clamping pulse generated from a clamping pulse and sampling pulse generating circuit 32. The output signal of this OB clamping circuit 28 is input into a cleaning circuit 29 and the OB period and H blanking period are cleaned.

The operations of the OB clamping circuit 28 and cleaning circuit 29 shall be explained in FIG. 3.

Figure 3A:
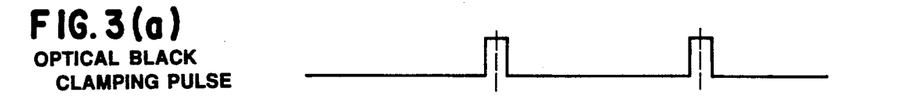
FIG. 3(a)-3(h) are timing diagrams for explaining the operations of an optical black clamping circuit and cleaning circuit.
Figure 3B:
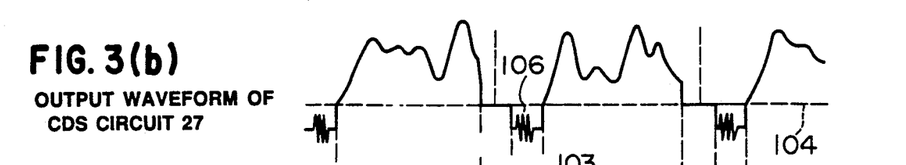

FIG. 3(b) is a graph of the output waveform of the double sampling circuit 27 and depicts a video signal having a period 101, OB period 102 and H blanking period 103. The potential 104 is a potential of the OB period 102. This potential 104 is at a level which is determined by the dark current of the CCD 19 and is also a black level. This OB period 102 is clamped by the OB clamping pulse shown in FIG. 3(a), and the dark current is removed and the black level is stabilized.

Figure 3C:
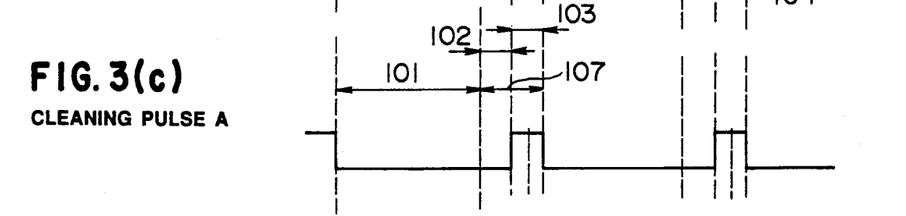
Figure 3D:
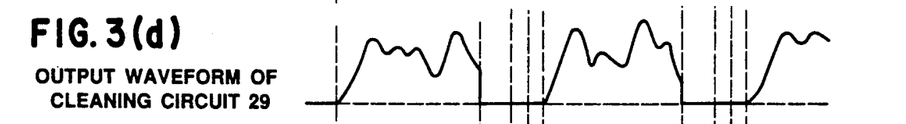
Figures 3E, 3F, 3G:
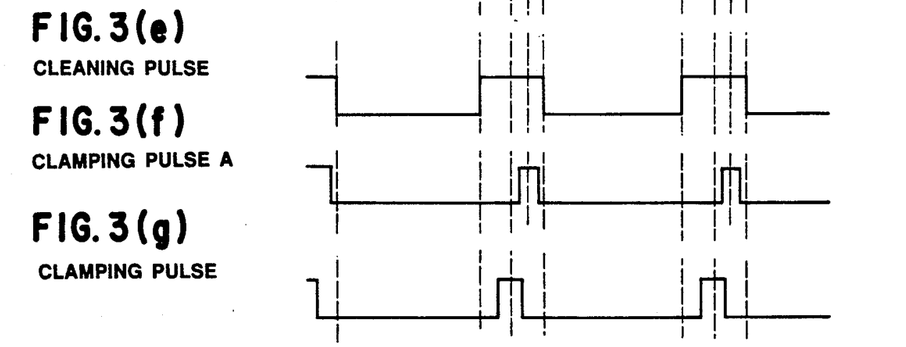

In the above mentioned cleaning circuit 29, the OB period 102 and the H blanking period 103 on which a pulsing noise 106 is superimposed in the signal from the CCD 19 are cleaned by such cleaning pulse as is shown in FIG. 3(e) generated by a clamping pulse and sampling pulse generating circuit 32.

The concrete operation of the above mentioned cleaning circuit 29 is made by switching with an analogue gate or the like the H blanking period 103 to the potential 104 in which the OB period 102 is clamped. The concrete examples of the OB clamping circuit 28 and cleaning circuit 29 are shown in FIG. 4.

Figure 4:
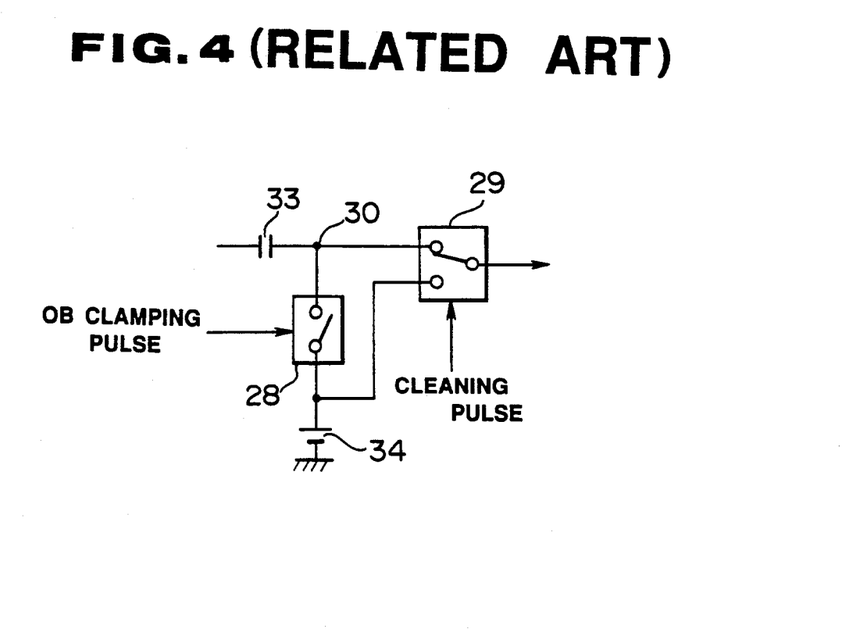
FIG. 4 is a block diagram showing an OB clamping circuit and cleaning circuit.

In FIG. 4, the OB clamping circuit 28 is formed of a clamping coupling condenser 33 and an analogue switch. When the analogue switch is switched on within the OB period 102, this OB clamping circuit will be direct current-clamped by the clamping potential 34 and will become the potential 104. The cleaning circuit 29 is also formed of an analogue switch and is switched to the clamping potential 34 side in the cleaning pulse period 107. As a result, the potential will become the same potential as the OB clamping potential 104. Further, as there is no noise in the OB clamping potential 104, the noise superimposed in the H blanking period 103 will be perfectly removed as shown in FIG. 3(d).

The output of the above mentioned cleaning circuit 29 is input into an automatic gain controlling circuit 37 and the output of the automatic gain controlling circuit 37 is input into a γ correcting circuit 38. The γ correcting circuit 38 converts the γ characteristic γ=1 of the output video signal of the CCD 19 to γ=0.45. The output of this γ correcting circuit 38 is input into a low pass filter (LPF) 39, the color carrier is removed and the luminance signal Y is extracted and is input into a mixer 41.

The output of the above mentioned γ correcting circuit 38 is branched. In the clamping circuits 44 and 46, by such an H blanking clamping pulse as is shown in FIG. 3(g) generated by the clamping pulse and sampling pulse generating circuit 32, the H blanking period is direct current-clamped and is input into the sample holding circuits 42 and 43. In the sample holding circuits 42 and 43, the sampling pulses generated from the clamping pulse and sampling pulse generating circuit 32 are respectively input and R and B color signals are separated and extracted from the color carrier signal and are synchronized in a synchronizing circuit 49 through LPF's 47 and 48.

Figure 5A:
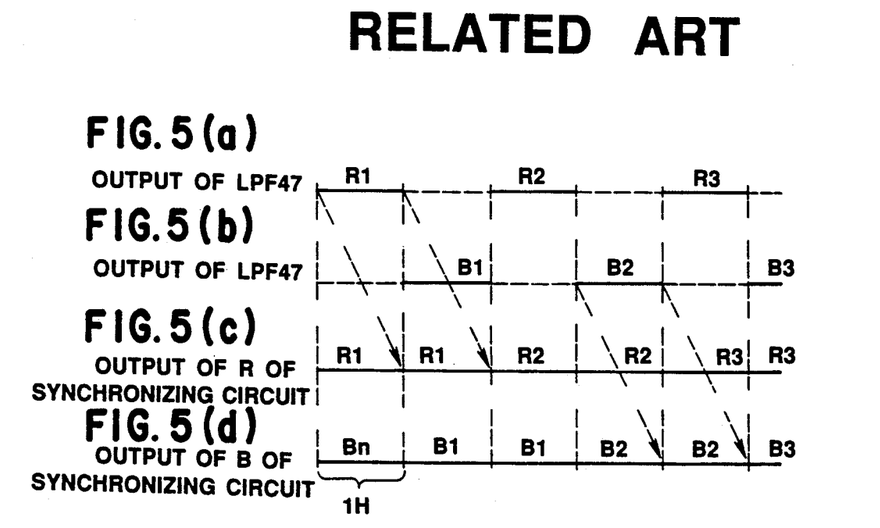

The operation of the synchronizing circuit 49 shall be explained in FIG. 5.

FIG. 5(a) is a diagram of the timing of an R color signal output which is the output of the LPF 47. FIG. 5(b) is of the timing of a B color signal output which is the output of the LPF 48. These R color signal and B color signals are extracted at 1H and are input into the synchronizing circuit 49. The synchronizing circuit 49 has a 1H delay circuit, delays the R and B color signals by 1H, interpolates the parts (shown by the broken lines in the drawing) lacking the R and B color signals and obtains the synchronized signals as in FIGS. 5(c) and (d).

The synchronized R and B color signals are input into subtracters 51 and 52 and color difference signals R−Y and B−Y are produced by the luminance signal Y output from the above mentioned LPF 39 and are input into a color encoder circuit 53 in which a chroma signal is produced from the color difference signals R−Y and B−Y and is input into the above mentioned mixer 41. In this mixer, the chroma signal is superimposed on the luminance signal Y and is output as a composite signal to a monitor not illustrated.

In the above mentioned circuit in which the OB clamping circuit 28 and cleaning circuit 29 are only provided on the input side of the automatic gain controlling circuit 37, the slip of the black balance by the above mentioned interference can not be neglected, because there is a problem that, if a noise (residual carrier) is present in the OB period 102, the voltage value of the branching point 30 in FIG. 4 will fluctuate and will not be equal to the clamping potential 34.

Also, in the color difference signal generating part explained in FIG. 2, if the direct current level of the signal is fluctuated by the above mentioned fluctuation or a residual carrier is present in the OB period of the input signals of the sampling circuits 42 and 43, the black balance of the color difference signal will fluctuate when the gain of the AGC 37 varies.

Generally, in the OB period 102, the pixels of the CCD 19 are light-shielded and the number of the light-shielded pixels is limited to the required minimum. Among the horizontal direction pixels of the CCD 19, ten or more pixels are allotted as OB detecting pixels. The time of the OB period 102 is about 2 μs. The OB clamping pulse is of a pulse width of about 1 μs. The pulse width is so narrow that it is necessary to elevate the active frequency band of the clamping circuit. For the cleaning purpose, in order to make the pulse width of the clamping pulse as wide as possible and to make positive clamping possible with a simple circuit, the clamping period is widened and clamping is made possible by a clamping pulse, for example, of more than 1 μs. However, in such a circuit in which a noise or the like is superimposed on the OB period 102 as is mentioned above, there is a problem that the black level is unstable as mentioned above.

In the publication of Japanese Patent Laid Open Application No. 236274/1987, there is disclosed a technique wherein a black level correcting means operative at a time of the third gain is provided for an output of a video amplifier at the time of no incident light. However, correction of the gain varying steplessly is not described.

SUMMARY OF THE INVENTION

An object of the present invention is to provide a solid state imaging apparatus having a control circuit whereby no residual carrier is made to be present in the optical black period of a video signal and a stabilized black level can be obtained.

The solid state imaging apparatus of the present invention comprises a gain adjusting circuit provided in a signal processing apparatus, receiving the photoelectrically converted output of a solid state imaging device and variably controlling the gain and a direct current-clamping circuit provided in the step after the gain adjusting circuit, direct current-clamping the optical black part included in the output signal of the solid state imaging device and stabilizing the black level of the video signal.

In the present invention, the output level of the signal from the solid state imaging device is adjusted by the gain adjusting circuit. This signal adjusted in the output level has the optical black part direct current-clamped by the direct current-clamping circuit.

BRIEF DESCRIPTION OF THE DRAWINGS

FIGS. 5(a)-5(d) are diagrams explaining operation of a synchronizing circuit.

FIGS. 6 to 9 relate to the first embodiment of the present invention.

DETAILED DESCRIPTION OF A PREFERRED EMBODIMENT OF THE INVENTION

FIGS. 6 to 9 show an embodiment of the present invention.

Figure 3H:
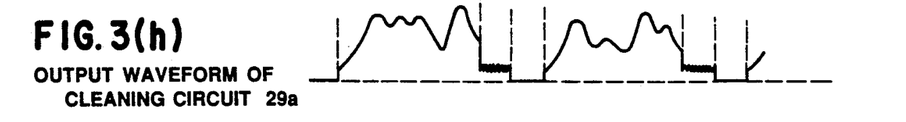
Figure 6:
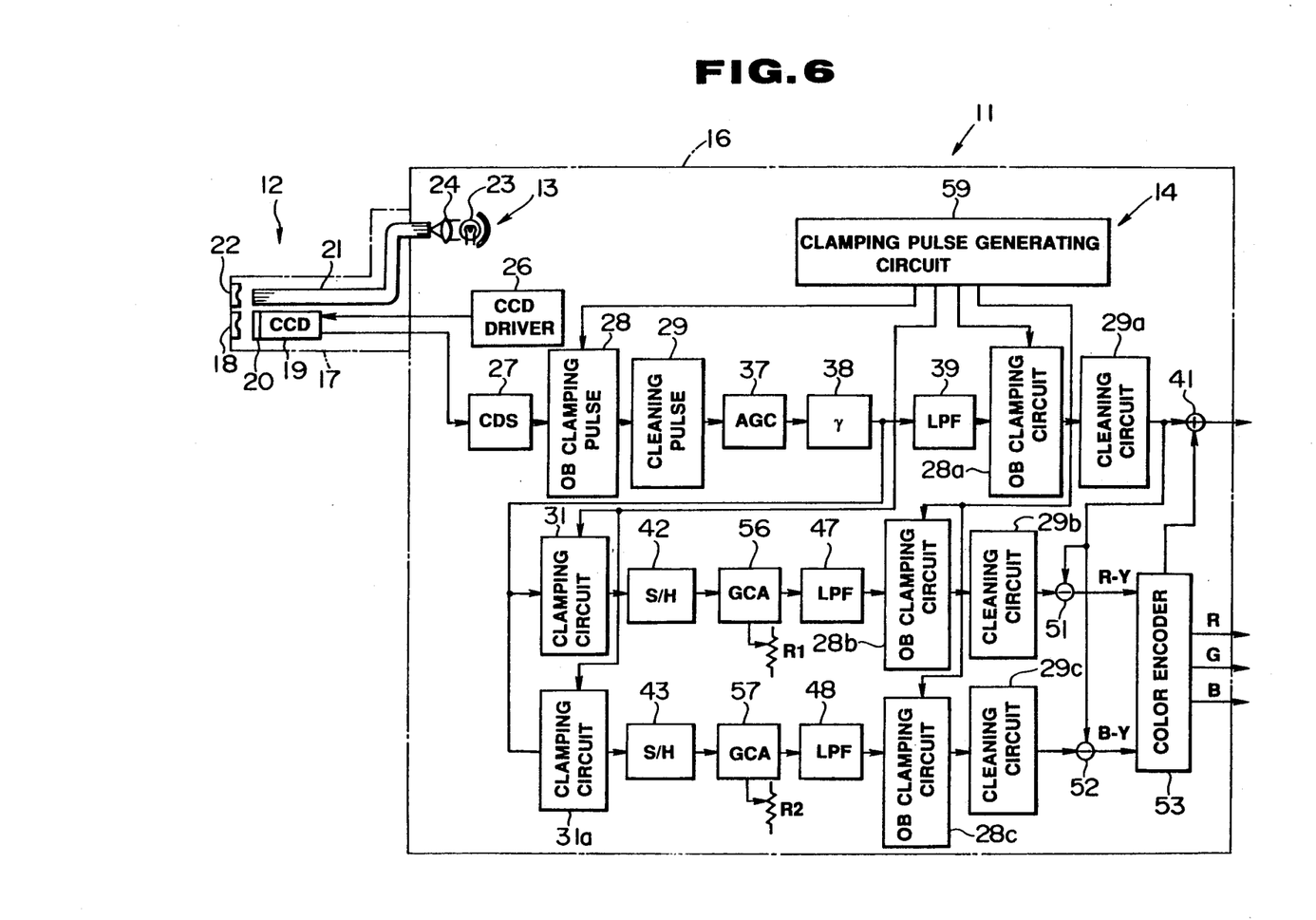
FIG. 6 is a block diagram for explaining the formation of a solid state imaging apparatus.

In FIG. 6, the output signal of a CCD 19 is input into a double sampling circuit 27 forming a signal processing part 14. This double sampling circuit 27 sampling to remove the 1/f and reset noise included in the CCD output signal and makes a signal improved in its S/N ratio. This signal is input into an OB clamping circuit 28 as a dark current removing means. In the OB clamping circuit 28, an OB period 102 is direct current-clamped by the clamping pulse generated by a clamping pulse generating circuit 59 and is input into a cleaning circuit A 29. The period part 103 except the OB period 102 and video signal period 101 is cleaned by a cleaning pulse A as shown in FIG. 3(c). The reason for excepting the OB period 102 is to again clamp the OB period 102 of the outputs of gain controlling amplifiers 37, 56 and 57 in the later steps. The output waveform of the cleaning circuit 29(a) is as shown in FIG. 3(h). In the video period 101 and OB period 102, as the generated error voltage and the residual carrier are correlated with each other, by utilizing this correlation, the required respective processes and gain control are applied to the luminance system and color difference signal system and then the systems are again OB clamped so that the fluctuation errors generated respectively in the luminance system and color difference signal system may be removed. The output of the cleaning circuit 29(a) is input into a γ correcting circuit 38 through a gain controlling circuit 37. The output of the γ correcting circuit 38 is branched and input into an LPF 39 and clamping circuits 31 and 31a and are input respectively into sample holding circuits 42 and 43. The clamping circuits 31 and 31a are direct current-clamped by the clamping pulse A shown in FIG. 3(f). In the case that the output of the above mentioned γ correcting circuit 38 is direct current-connected to the sample holding circuits 42 and 43, the cleaning circuit 29(a) and clamping circuits 31 and 31a will not be required. In the sample holding circuits 42 and 43, when the sampling pulse is input, R and B color signals will be separated and extracted from the color carrier signal.

Figures 7, 7A, 7B, 7C:
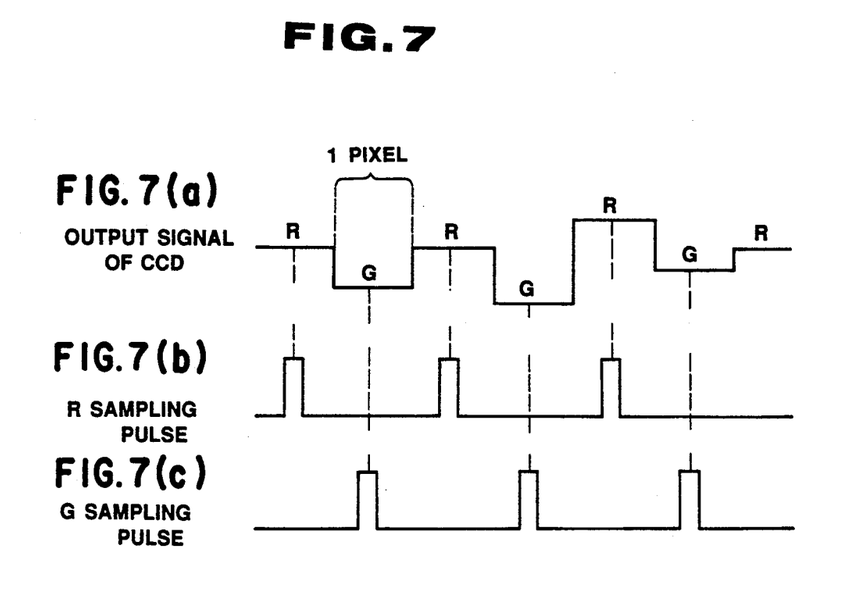
FIGS. 7(a)-7(c) are timing charts for explaining the operation of a sample holding circuit.

FIG. 7(a) is of an output example of a CCD 19 In the case of the CCD 19 in which a color mosaic filter 20 provided alternately with lines of R, G, R, G, ... and lines of B, G, B, G, ... is pasted on the imaging surface, color information will be alternately obtained, for example, as R, G, R, G, ... in the nth line. When these color information signals are respectively sample-held by such R sampling pulse as in FIG. 7(b) and such G sampling pulse as in FIG. 7(c) and the difference of the sample-held color signals is taken, an R−G signal will be obtained. In the next (n+1) th line, a B−G signal will be obtained in the same manner.

Besides the above sampling method, a method of obtaining a color difference signal by extracting a color carrier with a band pass filter (BPF) and detecting it can be considered.

An R−G signal is obtained in the output of the above mentioned sample holding circuit 42 and a B−G signal is obtained in the output of the sample holding circuit 43. The outputs of these sample holding circuits 42 and 43 are amplified in voltage by gain controlling amplifiers (which shall be abbreviated as GCA's hereinafter) 56 and 57, are input into OB clamping circuits 28b and 28c through LPF's 47 and 48 and are clamped and the OB period 102 is clamped. The GCA's 56 and 57 are provided to take a proper white balance. The amplified gains of the GCA's 56 and 57 are respectively variable to be optimum by variable resistors so that, even if the color temperature of the object varies, the color difference signals R−Y and B−Y which are outputs of subtracters 51 and 52 may be respectively R−Y=0 and B−Y=0.

Here, the respective gains of the GCA's 56 and 57 are different by more than twice due to the spectral characteristic of the CCD 19 or the light source color temperature of the object. For example, in the OB clamping circuits 28b and 28c in FIG. 6, if a noise or residual color carrier is superimposed on the OB period 102 and an error is produced in the clamping potential of the OB period 102, this error voltage will be amplified as it is by the GCA's 56 and 57. As this error voltage becomes an unstable factor of the black balance, the OB period 102 in the above mentioned OB clamping circuits 28b and 28c is clamped.

Figures 8, 9:
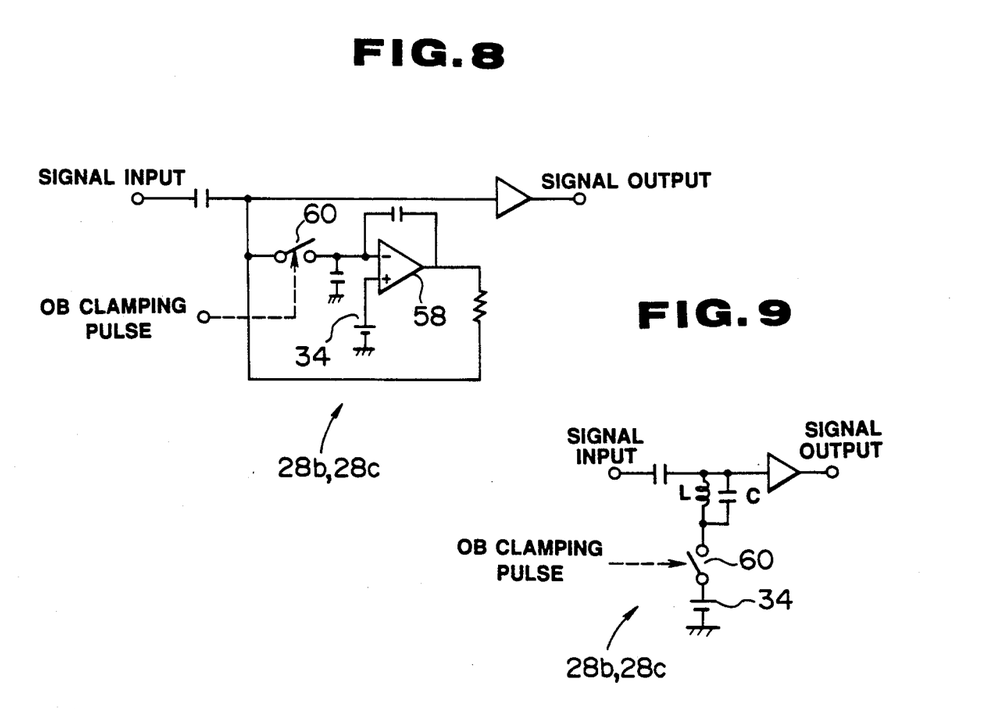
FIG. 8 is a circuit diagram of an OB clamping circuit.
FIG. 9 is a circuit diagram of another OB clamping circuit.

The above mentioned OB clamping circuits 28b and 28c may be feedback clamps wherein, as shown in FIG. 8 the signal is input into an inverse input terminal of an operating amplifier 58 through an analogue switch 60 switched on and off by an OB clock pulse and the OB clamping potential 34 is input into a non-inverse input terminal or, as shown in FIG. 9, an LC oscillating circuit may be formed and the resonant frequency may be made a repeated frequency of the residual carrier.

The outputs of the above mentioned OB clamping circuits 28b and 28c are input respectively into the cleaning circuits 29b and 29c. These cleaning circuits 29b and 29c are provided so that, in case the color difference signal is again direct current-clamped in the H blanking period 103 within the color encoder 53, as the clamping pulse phase for clamping the H blanking period 103 and the timing of the OB period 102 do not coincide with each other, a clamping period may be made at the cleaning circuits 29b and 29c.

The output of the above mentioned $\gamma$ correcting circuit 38 is output also to the LPF 39 in which the color carrier is removed and the luminance signal Y is extracted. The extracted luminance signal Y is direct current-clamped in the OB clamping circuit 28a, is further cleaned in the cleaning circuit 29a and is input into a mixer 41. In this mixer 41, the chroma signal produced in the above mentioned color encoder is input and is superimposed on the luminance signal Y and a composite signal is output. Three primary color signals of R, G and B are also output from the color encoder 53.

In this embodiment, when the OB clamping circuits 28a, 28b and 28c are provided in the steps after the gain controlling amplifiers 37, 56 and 57, the error voltage produced by the gain controlling amplifiers 37, 56 and 57 will be able to be absorbed and the black balance of the luminance signal and color difference signal will be able to be stabilized.

The above explanation has been made as to an endoscope having an illuminating means feeding an illuminating light but is also applicable to a general solid state imaging apparatus having no illuminating means.

As described above, according to the present invention, as the OB clamping circuit is provided in the step after the gain controlling amplifier, the unstable factor generated in the case of the gain control can be absorbed and a stabilized black level can be obtained.

In this invention, it is apparent that working modes different in a wide range can be formed on the basis of this invention without departing from the spirit and scope of the invention. This invention is not restricted by its specific working modes except being limited by the appended claims.

What is claimed is:

1. A solid state imaging apparatus comprising:
    an imaging means having a solid state imaging device for photoelectrically converting an object image and outputting a picture image signal;
    a signal processing means connected with said imaging means, for processing said picture image signal obtained by said solid state imaging device and outputting a video signal;
    a gain adjusting means provided in said signal processing means for receiving the photoelectrically converted output of said solid state imaging device and variably controlling the gain; and
    a direct current-clamping means connected to receive an output from said gain adjusting means for direct current-clamping an optical black part included in the output signal of said solid state imaging device and stabilizing the black level of said video signal.

2. A solid state imaging apparatus according to claim 1, wherein said direct current-clamping means further comprises an operational amplifier for feedback clamping.

3. A solid state imaging apparatus according to claim 1, wherein said direct current-clamping means further comprises an LC oscillating circuit.

4. A solid state imaging apparatus according to claim 1, wherein said imaging means is an electronic endoscope having a tip part which has an insertable part which can be inserted into an object to be inspected, and said solid state imaging device is in said tip part.

5. A solid state imaging apparatus according to claim 4, wherein said electronic endoscope is an electronic endoscope having a simultaneous imaging system provided with color filter separating color lights of red, green and blue on the imaging surface of said solid state imaging device.

* * * * *